United States Patent
Brusca et al.

(10) Patent No.: US 7,703,194 B2
(45) Date of Patent: Apr. 27, 2010

(54) METHOD FOR CREATING WRITE ELEMENT HAVING HIGH MAGNETIC MOMENT CO-FE-O-N FILM WITH SOFT MAGNETIC PROPERTIES

(75) Inventors: Brian E. Brusca, San Jose, CA (US); Joel S. Forrest, San Jose, CA (US); Richard Hsiao, San Jose, CA (US); James D. Jarratt, San Jose, CA (US); Brian R. York, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 11/688,168

(22) Filed: Mar. 19, 2007

(65) Prior Publication Data

US 2007/0169337 A1    Jul. 26, 2007

Related U.S. Application Data

(62) Division of application No. 10/242,508, filed on Sep. 11, 2002, now Pat. No. 7,233,458.

(51) Int. Cl.
*G11B 5/193* (2006.01)

(52) U.S. Cl. ............... 29/603.14; 29/603.13; 29/603.11; 360/125.04; 428/812

(58) Field of Classification Search ............... 29/603.07, 29/603.11, 603.13, 603.14; 360/119.11, 360/125.04, 125.06, 125.41; 428/811.2, 428/811.3, 812; 204/192.1, 192.11
See application file for complete search history.

(56) References Cited

U.S. PATENT DOCUMENTS

| | | | |
|---|---|---|---|
| 4,853,815 A | * | 8/1989 | Diepers ................. 360/125.06 |
| 5,439,754 A | | 8/1995 | Iwasaki et al. ............... 428/812 |
| 5,998,048 A | | 12/1999 | Jin et al. ..................... 428/694 |
| 6,137,652 A | * | 10/2000 | Ezaki et al. ......... 360/119.11 X |
| 6,144,533 A | | 11/2000 | Fukuda et al. ............... 360/313 |
| 6,151,193 A | | 11/2000 | Terunuma et al. ........... 360/126 |

(Continued)

FOREIGN PATENT DOCUMENTS

JP        59-16972        *    1/1984    ............... 204/192.1

(Continued)

OTHER PUBLICATIONS

Tagawa, Ikuyu et al., "High-Performance Write Head Design and Materials", Dec. 2001, Fujitsu Sci. Tech J., 37,2, p. 164-173.

(Continued)

*Primary Examiner*—A. Dexter Tugbang
(74) *Attorney, Agent, or Firm*—Zilka-Kotab, PC

(57) ABSTRACT

A method for creating a write element of a magnetic head according to one embodiment includes forming a first pole pedestal; forming a write gap layer above the first pole pedestal; forming a second pole pedestal above the write gap layer; and forming at least one of: a cap layer of CoFeON between the first pole pedestal and the write gap, and a seed layer of CoFeON between the write gap layer and the second pole pedestal. Note that other layers may be interspersed between those set forth here.

18 Claims, 4 Drawing Sheets

U.S. PATENT DOCUMENTS

| | | | |
|---|---|---|---|
| 6,163,442 A | 12/2000 | Gill et al. | 360/317 |
| 6,224,719 B1 | 5/2001 | Westwood | 204/192.2 |
| 6,233,116 B1 | 5/2001 | Chen et al. | 360/126 |
| 6,252,748 B1 | 6/2001 | Yamanaka et al. | 360/126 |
| 6,278,590 B1 | 8/2001 | Gill et al. | 360/317 |
| 6,296,955 B1 | 10/2001 | Hossain et al. | 428/692 |
| 6,330,128 B1 | 12/2001 | Chang et al. | 360/126 |
| 6,342,311 B1 | 1/2002 | Inturi et al. | 428/692 |
| 6,381,093 B2 | 4/2002 | Yoshida et al. | 360/126 |
| 6,487,041 B2 | 11/2002 | Yamanaka et al. | 360/126 |
| 6,697,220 B2 | 2/2004 | Sasaki | 360/126 |
| 7,233,458 B2 | 6/2007 | Brusca et al. | 360/126 |

FOREIGN PATENT DOCUMENTS

| | | |
|---|---|---|
| JP | 63191314 | 8/1988 |
| JP | 05267057 A * | 10/1993 |
| JP | 10241125 | 9/1998 |

OTHER PUBLICATIONS

Yuan, S. et al., "Advanced Write Heads for High Density and High Data rate Recording", not yet published.

Office Action Summary from U.S. Appl. No. 10/242,508 mailed on May 11, 2006.

Office Action Summary from U.S. Appl. No. 10/242,508 mailed on Jun. 30, 2006.

Office Action Summary from U.S. Appl. No. 10/242,508 mailed on Oct. 18, 2006.

Notice of Allowance from U.S. Appl. No. 10/242,508 mailed on Feb. 5, 2007.

* cited by examiner

| deposition details | film stress (Mpa) | Hce (Oe) | Hch (Oe) | Resistivity (mu ohm-cm) | Co (atomic %) | Fe (atomic %) | N (atomic %) | O (atomic %) | magnetic moment, Ms (kG) |
|---|---|---|---|---|---|---|---|---|---|
| 1.7x10⁻² mbarr | -1120 | 129.3 | 128.7 | 18.67 | 28.2 | 71.5 | 0.3 | --- | 23.869 |
| 2.0x10⁻² mbarr | -358.7 | 51.97 | 38.3 | 20.2 | 27.8 | 71.9 | 0.3 | --- | 23.96 |
| optimal (2.3x10⁻² mbarr) | 273 | 24.34 | 14.69 | 25.3 | 27.9 | 70.9 | 0.4 | 0.8 | 23.86 |
| 3.1x10⁻² mbarr | 497.4 | 78.35 | 70.61 | 52.75 | 26.7 | 66.4 | 0.6 | 6.3 | 22.6 |
| "zero oxygen" | -334 | 114.7 | 112 | 17.92 | 28.2 | 71.5 | 0.3 | --- | 23.95 |
| zero nitrogen | -1202 | 135.7 | 134 | 14.5 | 28.5 | 71.3 | 0.2 | --- | 24.1 |
| 2x nitrogen gas flow | 347.7 | 51.32 | 50.4 | 44.15 | 27.1 | 70.9 | 0.7 | 4.7 | 22.964 |

FIG. 4

METHOD FOR CREATING WRITE ELEMENT HAVING HIGH MAGNETIC MOMENT CO-FE-O-N FILM WITH SOFT MAGNETIC PROPERTIES

RELATED APPLICATIONS

This application is a divisional of U.S. patent application Ser. No. 10/242,508 filed Sep. 11, 2002 now U.S. Pat. No. 7,233,458.

FIELD OF THE INVENTION

The present invention relates to a high moment CoFe based film for a pole piece layer in a magnetic head, and more particularly, this invention relates to the manufacturing and application of high moment CoFeON film for a pole piece layer in a magnetic head.

BACKGROUND OF THE INVENTION

In a disk drive, a magnetic recording head is made of read and write elements. The write element is used to record and erase data bits arranged in circular tracks on the disk while the read element plays back a recorded magnetic signal. The magnetic recording head is mounted on a slider which is connected to a suspension arm, the suspension arm urging the slider toward a magnetic storage disk. When the disk is rotated the slider flies above the surface of the disk on a cushion of air which is generated by the rotating disk.

Write heads for disk or tape drives commonly include Permalloy (approximately 80% Ni and 20% Fe), which is formed in thin layers to create magnetic features. For example, an inductive head may have conductive coils that induce a magnetic flux in an adjacent Permalloy core, that flux employed to magnetize a portion or bit of an adjacent media. That same inductive head may read signals from the media by bringing the core near the magnetized media portion so that the flux from the media portion induces a flux in the core, the changing flux in the core inducing an electric current in the coils. Alternatively, instead of inductively sensing media fields, magnetoresistive (MR) sensors or merged heads that include MR sensors may use thinner layers of Permalloy to read signals, by sensing a change in electrical resistance of the MR sensor that is caused by the magnetic signal.

In order to store more information in smaller spaces, transducer elements have decreased in size for many years. One difficulty with this decreased size is that the amount of flux that needs to be transmitted may saturate elements such as magnetic pole layers, which becomes particularly troublesome when ends of the pole layers closest to the media, commonly termed poletips, are saturated. Magnetic saturation in this case limits the amount of flux that is transmitted through the poletips, limiting writing or reading of signals. Moreover, such saturation may blur that writing or reading, as the flux may be evenly dispersed over an entire poletip instead of being focused in a corner that has relatively high flux density. For these reasons the use of high magnetic moment materials in magnetic core elements has been known for many years to be desirable.

In order to write to higher coercivity media, which is more stable once written to, materials with higher magnetization are required to produce the necessary higher flux density. High magnetic moment materials allow application of higher flux density or higher field into the media, and thus enable writing to media having higher coercivity. High magnetic moment materials also allow the head to write a smaller bit, i.e., to write a higher bit density per length of track.

Iron is known to have a higher magnetic moment than nickel, so increasing the proportion of iron compared to nickel generally yields a higher moment alloy. Iron, however, is also more corrosive than nickel, which imposes a limit to the concentration of iron that is feasible. Also, it is difficult to achieve soft magnetic properties for iron-rich NiFe compared to nickel-rich NiFe. Nitrogen or nickel can be added to NiFe to reduce the magnetic hardness of the film, but the addition of these elements can dilute the magnetic moment significantly.

NiFe (80/20 Permalloy) is known to have a magnetization of 10 kGauss. CoFe alloys are known to a have a much higher magnetic moment, with a magnetization of about 24 kGauss. However, CoFe has only recently gained popularity as a construction material because it is magnetically hard, i.e., has a high coercivity so it requires a high magnetic field to switch direction. CoFe is also prone to corrosion.

What is needed is a CoFe based film which takes advantage of the high magnetization properties of CoFe, but which is also magnetically soft and therefore does not need a high current through the coils to switch the writer.

What is further needed is a CoFe based film which resists corrosion.

SUMMARY OF THE INVENTION

High moment magnetic thin films are important in the manufacture of high density magnetic recording devices, specifically in the fabrication of the writer. Higher flux densities generated from ever-shrinking writer poles are required to write data into higher coercivity media. Reactively sputtered Co—Fe—O—N (hereinafter CoFeON) films described herein have the high magnetic moment required, and additionally are soft enough magnetically to function as writer pole materials. Further, these CoFeON films are resistant to corrosion.

Accordingly, a write element of a magnetic head is provided. The write element includes a first pole pedestal and a second pole pedestal opposing the first pole pedestal and defining a write gap between the first and second pole pedestals. A first layer of CoFeON is film positioned between the first pole pedestal and the write gap. A second layer of CoFeON film is positioned between the second pole pedestal and the write gap.

The layers of CoFeON film preferably contain between 0.2 and 1.0 atomic percent of N, and ideally between 0.3 and 0.6 atomic percent of N. The layers of CoFeON film also preferably contain between 0.2 and 5 atomic percent of O, and ideally between 0.3 and 1.2 atomic percent of O. Also preferably, the layers of CoFeON film contain between 20 and 50 atomic percent of Co.

Preferred dimensions for the first layer of CoFeON film is between 2000 and 4000 Å thick as measured between the first pole pedestal and the write gap. Preferred dimensions for the second layer of CoFeON film is between 1000 and 2200 Å thick as measured between the second pole pedestal and the write gap.

Preferably, the first layer of CoFeON film is longer than the first pole pedestal in a direction perpendicular to an air bearing surface of the magnetic head.

The layers of CoFeON film are preferably created during fabrication of the magnetic head by sputtering.

A method for creating a write element of a magnetic head according to one embodiment includes forming a first pole pedestal; forming a write gap layer above the first pole pedestal; forming a second pole pedestal above the write gap layer; and forming at least one of: a cap layer of CoFeON between the first pole pedestal and the write gap, and a seed layer of CoFeON between the write gap layer and the second pole pedestal. Note that other layers may be interspersed between those set forth here.

A process for creating a write element of a magnetic head according to another approach includes forming a first pole pedestal such as by plating or deposition. A cap layer of CoFe is formed above the first pole pedestal such as by plating or deposition. The cap layer is sputtered for adding N and O to the cap layer. A write gap layer is formed above the cap layer. A second seed layer of CoFe is formed above the write gap layer. The second seed layer is sputtered for adding N and O to the second seed layer. Finally, a second pole pedestal is formed above the second seed layer. Note that other layers may be interspersed between those set forth here.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 4 is a table setting forth results of sputtering under various operating conditions.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
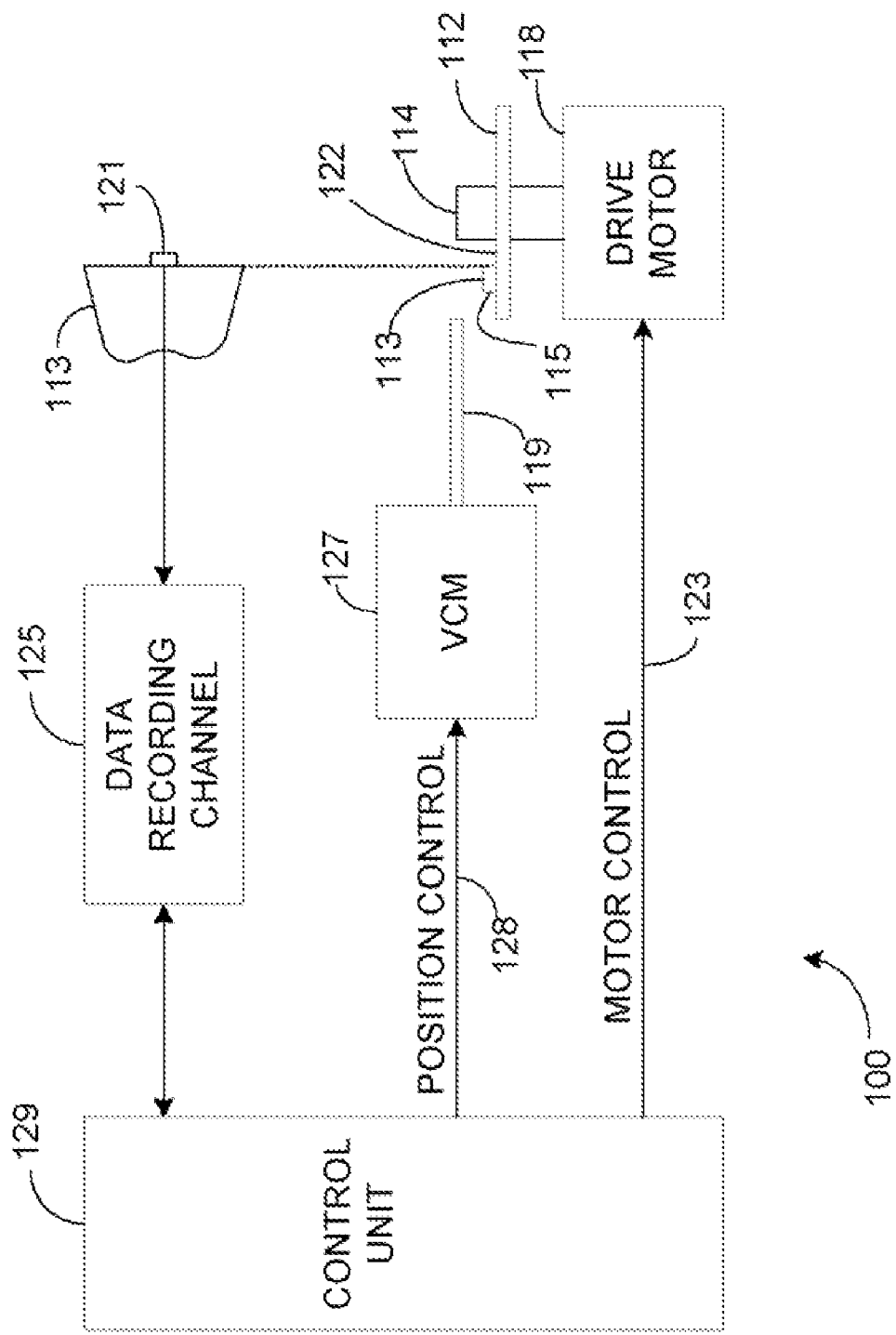
FIG. 1 is a perspective drawing of a magnetic disk drive system in accordance with one embodiment.

Referring now to FIG. 1, there is shown a disk drive 100 embodying the present invention. As shown in FIG. 1, at least one rotatable magnetic disk 112 is supported on a spindle 114 and rotated by a disk drive motor 118. The magnetic recording media on each disk is in the form of an annular pattern of concentric data tracks (not shown) on disk 112.

At least one slider 113 is positioned on the disk 112, each slider 113 supporting one or more magnetic read/write heads 121. More information regarding such heads 121 will be set forth hereinafter during reference to FIG. 4. As the disks rotate, slider 113 is moved radially in and out over disk surface 122 so that heads 121 may access different tracks of the disk where desired data are recorded. Each slider 113 is attached to an actuator arm 119 by means way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
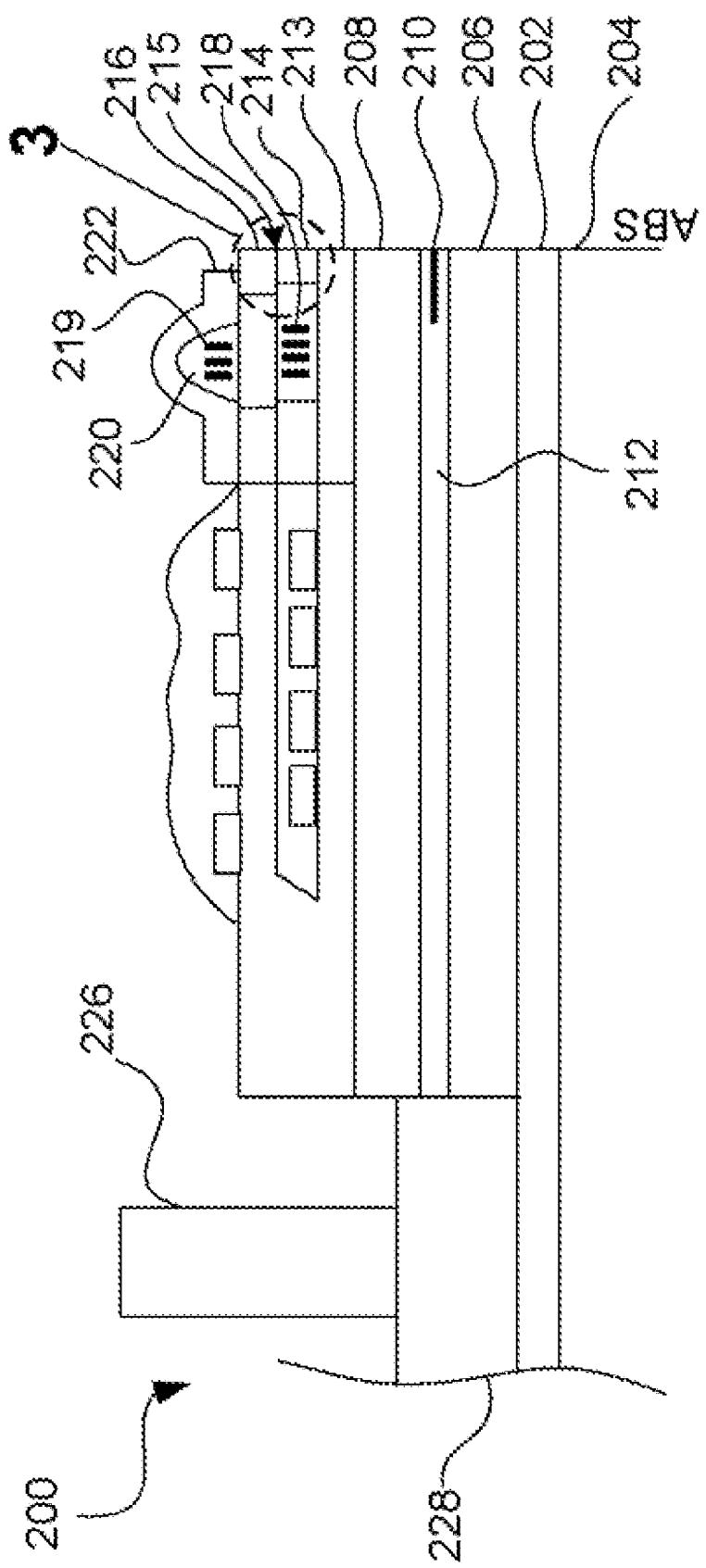
FIG. 2 is a cross sectional view of a magnetic recording head with improved magnetic characteristics, according to one embodiment.

FIG. 2 is a cross sectional view of a magnetic recording head 200 with improved magnetic characteristics, according to one embodiment (not drawn to scale). In FIG. 2, the reference numeral 204 denotes a substrate, 202 denotes an undercoating, 206 denotes a lower shield layer of the MR/GMR reproducing head part (read element), 208 denotes an upper shield layer of the, 210 denotes a MR/GMR layer provided through an insulating layer 212 between the lower shield layer 206 and the upper shield layer 208, 213 denotes a bottom writer pole of the write element, 214 denotes a pedestal on the bottom writer pole, 216 denotes top write pole tip above a write gap 215, 218 denotes a first coil layer, 219 denotes a second coil, 220 denotes an upper insulating layer deposited so as to cover the second coil conductor 219, and 222 denotes an upper pole stitched to the top pole tip 216 near the ABS. The upper pole 222 is magnetically connected with the bottom pole (upper shield layer) 208 at its rear portion so as to constitute a magnetic yoke together with the lower pole 208.

Referring to FIG. 2, a pad 226 is operatively coupled to a layer 228 positioned between the pad 226 and the undercoating 202, or can be positioned directly on the undercoating 202. For example, electric contact pads of the read and write elements are preferably separated from the undercoating by insulation planarization layers 228. Layer by layer planarization is preferably used, so the pad 226 can be added later, at a position away from the undercoating 202. Accordingly, one or more planarization layers 228 of $Al_2O_3$ are deposited on top of and beside the lower shield layer 206 and planarized back to the lower shield layer 206. Additional layers can be added.

As will be appreciated by one skilled in the art, additional layers and components not described herein may also be added. Also, not all layers shown are necessary. Finally, conventional materials may be used for most of the layers in addition to or instead of those mentioned herein.

High moment magnetic thin films are important in the manufacture of high density magnetic recording devices, specifically in the fabrication of the writer. Higher flux densities generated from ever-shrinking writer poles are required to write data into higher coercivity media. Reactively sputtered CoFeON films described here have the high magnetic moment required and additionally are soft enough magnetically to function as writer pole materials.

In developing the high moment CoFe based film, it was found that by using the correct processing conditions, a small amount of oxygen can be incorporated into the CoFeN film. The resulting CoFeON film was found to have much lower coercivity than the corresponding CoFe or CoFeN film without oxygen. An optimal amount of oxygen in the film was also found to not have the detrimental effect of lowering the magnetic moment. It has also been demonstrated that the use of this film improves writer performance significantly.

In experiments performed, the introduction of N into a CoFe film reduced the coercivity from over 100 to about 15-25 oersted. Magnetization also drops upon addition of N from about 24 kGauss to about 23 to 23.5 kGauss. Thus, the use of N provides a good balance between the desirable soft magnetic properties and high magnetization.

N also reduces corrosion in these films, which is desirable because the life of the head is extended.

The small amount of O added to the film further lowers the coercivity of the film and does not significantly lower the magnetization. Experiments have shown that the addition of O does not detrimentally affect the corrosivity of the film.

Note that O and N are added to the lattice of the CoFe by sputtering. Compounds are not created, i.e., this is not a nitride- or oxide-metal film. Rather the resulting film is a nitrogenated and/or oxygenated film. Nor should the nomenclature of the film, i.e., CoFeON, be considered to represent the stoichiometry of the resulting film.

Figure 3:
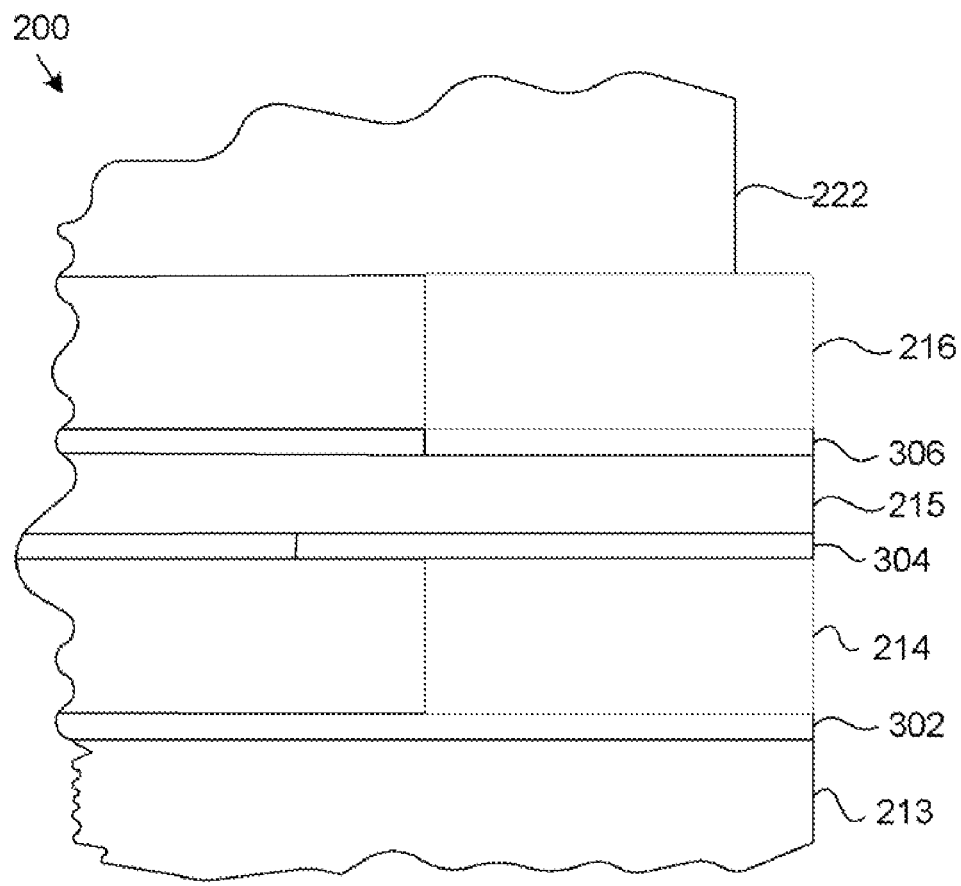
FIG. 3 is a detailed view taken from circle 3 of FIG. 2 according to a preferred embodiment.

FIG. 3 is a detailed view taken from circle 300 of FIG. 2 according to a preferred embodiment. As shown, a lower pedestal seed layer 302 is positioned between the lower writer pole 213 and the pedestal 214. A cap layer 304 of CoFeON is positioned between the lower pedestal 214 and the write gap 215. As shown, this cap may extend beyond the lower pedestal 214 in a direction perpendicular to and away from the air bearing surface (ABS).

An upper pedestal seed layer 306 of CoFeON is positioned between the upper pedestal 216 and the write gap 215. Preferably, the upper pedestal seed layer 306 does not extend beyond the upper pedestal 216 in a direction perpendicular and away from the ABS. For purposes of the present discussion, assume that the pedestals 214,216 are of NiFe.

Each film stack of the CoFeON and NiFe has a low coercivity. This is significant in that the interaction of the layers 214,304 and/or 306,216 make the entire film stack softer. According to one experiment, the magnetization of the stack (214,304 and/or 306,216) was about 23.5 kGauss while the magnetization of the NiFe pedestal alone was about 22 kGauss.

The strategic positioning of the cap 304 and upper pedestal seed layer 306 adjacent the write gap 215 provides the highest magnetization across the write gap 215; that is the highest density field from the writer.

The following simplified description is of an illustrative partial manufacturing process for generating the portion of the writer element shown in FIG. 3. Note that exemplary values and materials have been added for illustrative purposes only and are not meant to infer limiting values, ranges or substances.

To plate the write element, the lower pedestal seed layer 302 is added to the bottom writer pole 213. The lower pedestal 214 is plated on the lower pedestal seed layer 302. The lower pedestal 214 in an illustrative embodiment can be about 4 microns of high iron NiFe (22/78). A lower pedestal cap 304 is added by plating 2000-4000 Å (ideally about 3000 Å) of CoFe onto the lower pedestal 214. O and N are sputtered into the layer 304 of CoFe. The write gap 215, which can be made of alumina ($Al_2O_3$), is plated or deposited on the CoFeON film 304.

The upper pedestal seed layer 306 is added, which in this example is 1000-2200 Å (ideally about 1600 Å) of CoFeON deposited and sputtered on the write gap 215. The upper pedestal seed layer 306 is so named because it acts as a seed layer upon which about 4 microns of high iron NiFe (22/78) is plated to form the upper pedestal 216. Preferably, the upper pedestal seed layer 306 does not extend beyond the upper pedestal 216 in a direction perpendicular and away from the air bearing surface, and can be milled to the desired dimensions.

Note that additional layers may be interspersed between those set forth here.

The layers of CoFeON film preferably contain between 0.2 and 1.0 atomic percent of N, and ideally between 0.3 and 0.6 atomic percent of N. The layers of CoFeON film also preferably contain between 0.2 and 5 atomic percent of O, and ideally between 0.3 and 1.2 atomic percent of O. Also preferably, the layers of CoFeON film contain between 20 and 50 atomic percent of Co.

As mentioned above, the CoFeON films described herein are created by sputtering. Following is a brief description of a sputtering process that may be used. Again, values have been added to aid in understanding the process and are not meant to be limiting.

The sputtering target is a CoFe alloy and is placed in a sputtering chamber. The chamber is evacuated and backfilled with an inert process gas, such as Ar, at a low pressure. N is introduced in the process gas during the sputtering deposition. In a exemplary embodiment, N is about 1% of the background, while O is about 0.01% in the background.

Preferably, N is premixed into the Ar. O can also be premixed into the Ar, or can be controlled by allowing small amounts of resident gases to remain in the chamber after evacuation.

An electrical charge is applied to a filament in the chamber to strike a plasma. The result is removal of electrons from the Ar and creation of Ar ions (Ar+ and Ar++). This creates a plasma.

A radio frequency (RF) signal of about 13.56 MHz is applied to the sputtering target to create a bias. The negative bias on the target accelerates the Ar ions towards the target to dislodge Co and Fe atoms from the target. As mentioned above, O and N are added to the lattice of the CoFe film during film growth. Compounds are not created, nor is the film a nitride- or oxide-metal film. Rather the resulting film is a nitrogenated and/or oxygenated film.

The amount of O can be controlled by sputtering Ta onto collateral objects in the sputtering machine, such as shielding in the sputtering chamber. Ta acts as a getter of O, rendering the O inactive in the system.

The addition of N in the system enhances the acquisition of O into the film.

FIG. 4 is a table 400 setting forth results of sputtering under various operating conditions.

Another way to create the film is through use of a DC magnetron.

In use, the recording head structure and improvements set forth herein can be used in magnetic recording heads for any type of magnetic media, including but not limited to disk media, magnetic tape, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for creating a write element of a magnetic head, comprising:
   forming a first pole;
   forming a first pole pedestal above the first pole;
   forming a write gap layer above the first pole pedestal;
   forming a second pole pedestal above the write gap layer, wherein the pole pedestals define a write gap of the write element of the magnetic head;
   forming a second pole above the second pole pedestal; and
   forming at least one of: a cap layer of CoFeON between the first pole pedestal and the write gap, and a seed layer of CoFeON between the write gap layer and the second pole pedestal.

2. The method as recited in claim 1, wherein the at least one of the cap layer and the seed layer contains between 0.2 and 1.0 atomic percent of N.

3. The method as recited in claim 2, wherein the at least one of the cap layer and the seed layer contains between 0.3 and 0.6 atomic percent of N.

4. The method as recited in claim 1, wherein the at least one of the cap layer and the seed layer contains between 0.2 and 5 atomic percent of O.

5. The method as recited in claim 4, wherein the at least one of the cap layer and the seed layer contains between 0.3 and 1.2 atomic percent of O.

6. The method as recited in claim 1, wherein the at least one of the cap layer and the seed layer contains between 20 and 50 atomic percent of Co.

7. The method as recited in claim 1, wherein the cap layer is formed, the cap layer being between 2000 and 4000 Å thick as measured perpendicular to a plane of deposition thereof.

8. The method as recited in claim 1, wherein the seed layer is formed, the seed layer being between 1000 and 2200 Å thick a as measured perpendicular to a plane of deposition thereof.

9. The method as recited in claim 1, wherein the cap layer is formed, the cap layer being longer than the first pole pedestal in a direction perpendicular to an air bearing surface of the head.

10. The method as recited in claim 1, wherein the cap layer is formed, the cap layer being formed by sputtering a layer of CoFe for adding N and O thereto.

11. The method as recited in claim 1, wherein the seed layer is formed, the seed layer being formed by sputtering a layer of CoFe for adding N and O thereto.

12. A method for creating a write element of a magnetic head, comprising:
    forming a first pole;
    forming a first pole pedestal above the first pole;
    forming a cap layer of CoFe above the first pole pedestal;
    sputtering the cap layer for adding N and O to the cap layer;
    forming a write gap layer above the cap layer;
    forming a seed layer of CoFe above the write gap layer;
    sputtering the seed layer for adding N and O to the seed layer;
    forming a second pole pedestal on the seed layer; and
    forming a second pole above the second pole pedestal,
    wherein the first and second pole pedestals define a write gap of the write element of the magnetic head.

13. The method as recited in claim 12, wherein at least one of the cap layer and the seed layer contains between 0.2 and 1.0 atomic percent of N.

14. The method as recited in claim 12, wherein at least one of the cap layer and the seed layer contains between 0.2 and 5 atomic percent of O.

15. The method as recited in claim 12, wherein at least one of the cap layer and the seed layer contains between 20 and 50 atomic percent of Co.

16. The method as recited in claim 12, wherein the cap layer is between 2000 and 4000 Å thick as measured in a direction perpendicular to a plane of deposition thereof.

17. The method as recited in claim 12, wherein the seed layer is between 1000 and 2200 Å thick as measured in a direction perpendicular to a plane of deposition thereof.

18. The method as recited in claim 12, wherein the cap layer is longer than the first pole pedestal in a direction perpendicular to an air bearing surface of the method.

* * * * *